United States Patent [19]

Greene

[11] Patent Number: 4,937,314
[45] Date of Patent: Jun. 26, 1990

[54] COPOLYETHERESTER ELASTOMER WITH POLY(1,3-PROPYLENE TEREPHTHALATE) HARD SEGMENT

[75] Inventor: Robin N. Greene, Wilmington, Del.

[73] Assignee: E. I. Du Pont de Nemours and Company, Wilmington, Del.

[21] Appl. No.: 316,719

[22] Filed: Feb. 28, 1989

[51] Int. Cl.$^5$ ............................................ C08G 63/02
[52] U.S. Cl. ...................... 528/272; 528/308; 528/308.6; 528/308.7; 525/437
[58] Field of Search ............ 528/272, 308, 308.6, 528/308.7; 525/437

[56] References Cited

U.S. PATENT DOCUMENTS

| | | | |
|---|---|---|---|
| 3,023,192 | 3/1981 | Shiver | 528/300 |
| 3,243,413 | 7/1963 | Bell et al. | 528/295 |
| 3,651,014 | 12/1979 | Witsiepe | 528/301 |
| 3,775,374 | 3/1982 | Wolfe | 528/297 |
| 4,396,746 | 8/1983 | Toga | 525/444 |

OTHER PUBLICATIONS

Nishimura et al., "Elastomers Based on Polyester", J. Macromol. Sci. (Chem.), A1(4), 617–625 (1967).
Wolfe, "Elastomeric Polyetherester Block Copolymers", American Chemical Society Advances in Chemistry, 176, 129–151 (1979).

Primary Examiner—John Kight
Assistant Examiner—Sam A. Acquah

[57] ABSTRACT

A thermoplastic, segmented, linear copolyetherester elastomer of at least 70 weight percent soft segments, derived from poly(alkylene oxide) glycols and terephthalic acid, and hard segments constituting 10–30% of the elastomer and being 95 to 100% poly(1,3-propylene terephthalate). Melt-spun and drawn fibers of the elastomer have superior elastic and set properties versus comparable fibers made from such elastomers having hard segments of poly(ethylene terephthalate) or of poly(1,4-butylene terephthalate).

12 Claims, 1 Drawing Sheet

COPOLYETHERESTER ELASTOMER WITH POLY(1,3-PROPYLENE TEREPHTHALATE) HARD SEGMENT

BACKGROUND OF THE INVENTION

1. Field of the Invention

This invention relates to a thermoplastic, segmented, linear copolyesterether elastomer having soft segments derived from a poly(alkylene oxide) glycol. More particularly, the invention concerns such an elastomer having poly(1,3-propylene terephthalate) hard segments.

2. Description of the Prior Art

Various thermoplastic, linear polyetheresters elastomers have been suggested for the production of molded articles, films and fibers. Such polyetheresters are known, as for example, from Shivers, U.S. Pat. No. 3,023,192, Witsiepe, U.S. Pat. No. 3,651,014, Wolfe, U.S. Pat. No. 3,775,374, Bell et al, U.S. Pat. No. 3,243,413, Nishimura, et al, "Elastomers Based on Polyester", J. Macromol. Sci. (Chem.), A1(4), 617–625 (1967), and Wolfe, "Elastomeric Polyetherester Block Copolymers", American Chemical Society Advances in Chemistry, 176, 129–151 (1979), among others. Basically, these elastomers are composed of long chain ester units which constitute the "soft segments" of the elastomer and short chain ester units which constitute the "hard segments" of the elastomer.

I have found that thermoplastic, linear polyetherester elastomers for use in fibers or films generally require the soft segments to constitute at least 70 percent of the polyetherester elastomer. For the production of fibers or films, such elastomers having hard segments derived from poly(ethyleneterephthtalate) crystallize too slowly for satisfactory commercial manufacture; those having hard segments derived from poly(1,4-butylene terephthalate) crystallize well but provide fibers that would benefit much from improvements in elastic properties, especially, in set and unload power. Such improved elastomers would be particularly useful for conversion into fibers or films intended for elastification of diaper legs, among other articles. Accordingly, an object of this invention is to provide a thermoplastic linear polyetherester elastomer that can be converted into fibers or films having the above-mentioned desired combination of properties.

SUMMARY OF THE INVENTION

The present invention provides a thermoplastic, segmented, linear copolyetherester elastomer which consists essentially of a multiplicity of recurring intralinear long-chain and short-chain ester units connected head-to-tail through ester linkages, the long-chain ester units amounting to at least 70 percent by weight of the elastomer and being represented by the structure

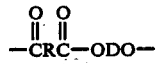  (I)

the short-chain ester units amounting to 10 to 30 percent by weight of the elastomer and being represented by the structure

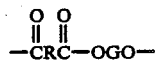  (II)

wherein
- R is a divalent radical remaining after removal of carboxyl groups from a dicarboxylic acid which consists essentially of terephthalic acid,
- G is a divalent radical remaining after removal of hydroxyl groups from a poly(alkylene oxide) glycol having a carbon-to-oxygen ratio in the range of 2.0 to 4.3 and a molecular weight in the range of 1,500 to 5,000, and
- D is a divalent radical remaining after removal of terminal hydroxyl groups from a diol which consists essentially of 1,3-propanediol. Thus, the short chain ester units are poly(1,3-propylene terephthalate). The present invention also provides fibers and films of the copolyetherester elastomer made by melt spinning.

BRIEF DESCRIPTION OF THE DRAWINGS

The invention will be better understood by reference to the drawings, which graphically compare elastic properties of fibers made with hard segments of poly(1,3-propylene terephthtalate) in accordance with the invention opposite such fibers made with hard segments of poly(1,4-butylene terephthalate). Plotted as a function of molar ratio of hard segment to soft segment of the elastomer is percent set in FIG. 1 and unload power in FIG. 2. The data from which the graphs are plotted are for the elastomeric filaments of Example I which have soft segments of poly(tetramethylene oxide) of 2,000 molecular weight.

DETAILED DESCRIPTION OF PREFERRED EMBODIMENTS

Figure 1:
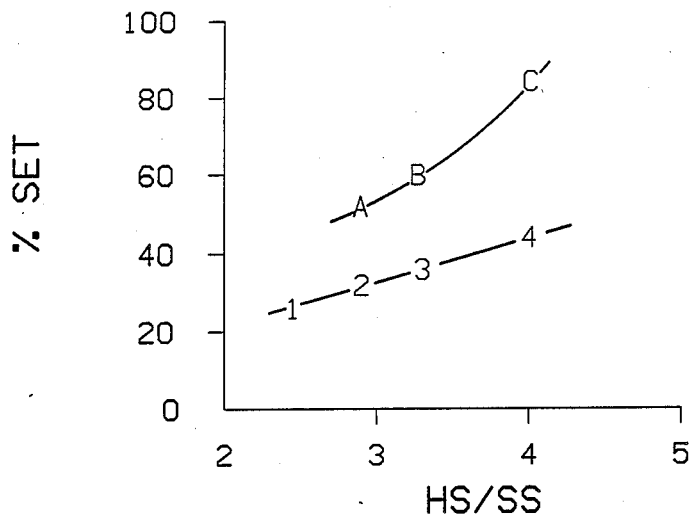

The invention is further illustrated by the following descriptions of preferred embodiments. These are included merely for the purposes of illustration and are not intended to limit the scope of the invention, which is defined by the appended claims.

In accordance with the present invention, the long chain ester units, of the structure shown in Formula I above, or "soft segments", are made by reacting terephthalic acid with a poly(alkylene oxide) glycol or mixtures of such glycols. These long chain glycols are polymeric glycols having terminal (or as nearly terminal as possible) hydroxy groups and a molecular weight in the range of 1,500 to 5,000, preferably 2,000 to 4,000.

The long chain glycols used in the preparation of elastomers of the invention are poly(alkylene oxide) glycols having a carbon-to-oxygen ratio in the range of 2 to 4.3. Representative of these long chain glycols are poly(ethylene oxide) glycol, poly(1,2-propylene oxide) glycol, poly(1,3-propylene oxide) glycol, poly(tetramethylene oxide) glycol, and glycols of random or block copolymers of ethylene oxide and 1,2-propylene oxide, of tetrahydrofuran and ethylene oxide or of tetrahydrofuran with minor amounts of 3-methyltetrahydrofuran (used in proportions such that the carbon-to-oxygen mole ratio in the glycol does not exceed about 4.3). When copolymers of tetrahydrofuran with 3-methyltetrahydrofuran are employed, the 3-methyltetrahydrofuran content of the copolymer is preferably in the range of 7 to 15 percent.

The short chain ester units, or "hard segments" are polyesters formed by the reaction of terephthalic acid and 1,3-propanediol. When incorporated into the elastomer, the polyester forms the short chain ester repeating units (hard segments) of the structure shown in Formula II above. Usually, the hard segments of the elastomers of the invention constitute 10 to 30 percent by weight of the total elastomer. Preferably, the hard segments amount to 15 to 27%.

In accordance with the invention, the short chain ester units consist essentially of poly(1,3-propylene terephthalate). By "consist essentially of" is meant that about 95 percent or more by weight of the short chain ester units are identical and are poly(1,3-propylene terephthalate) units. The other short chain ester units (i.e., up to 5% other units) can be derived from any combination of other alicyclic or acyclic dihydroxy compounds and/or aromatic, aliphatic or cycloaliphatic dicarboxylic acids of low molecular weight (i.e., having a molecular weight of no more than about 300) so long as they do not detrimentally affect the properties of the resultant elastomer. Preferably, substantially all (i.e., 99–100%) of the short chain ester units are of poly(1,3-propylene terephthalate).

The term "dicarboxylic acid" or terephthalic acid, as used herein, includes equivalents of such acids having two functional carboxyl groups which perform substantially as do dicarboxylic acids in reaction with glycols and diols in forming copolyetherester polymers. Such equivalents include esters and ester-forming derivatives.

The elastomers described herein can be made conveniently by starting with a conventional ester interchange reaction. For example, the dimethyl ester of terephthalic acid is heated with a long chain glycol, an excess of 1,3-propanediol, and a small amount of branching agent, if desired, in the presence of a catalyst at a temperature in the range of 180° to 260° C. Methanol formed by the ester interchange is distilled off. Depending on temperature, catalyst, glycol excess and particular equipment being used, the reaction can be completed within a few minutes to a few hours. This procedure yields a prepolymer which can be increased in molecular weight by the procedure described below.

The prepolymers of the preceding paragraph can be prepared by other known methods of esterification or ester interchange. For example, the long chain glycol can be reacted with a high or low molecular weight short chain ester homopolymer or copolymer in the presence of catalyst until randomization occurs. The short chain ester homopolymer or copolymer also can be prepared by ester interchange from free acids with diol acetates. Short chain ester polymer also can be prepared by direct esterification from suitable acids, anhydrides, or acid chlorides, for example, with diols, or by other processes such as reaction of the acids with cyclic ethers or carbonates. The prepolymer also can be prepared by these reactions in the presence of the long chain glycol.

Prepolymer, prepared as described in the preceding paragraphs, can be increased to higher molecular weights by distillation of the excess of 1,3-propanediol in known polycondensation methods. Additional ester interchange occurs during this polycondensation or distillation. The distillation increases the molecular weight and randomizes the arrangement of copolyester units. Best results usually are obtained when the final distillation or polycondensation is performed at a pressure below 5 mm of Hg and a temperature in the range of 220°–260° C. for less than 6 hours (e.g., 0.5 to 5 hours in the presence of conventional antioxidants). Most practical polymerization techniques rely upon ester interchange to complete the polymerization reaction. To avoid excessively long periods at high temperatures, with attendant possible thermal degradation, a catalyst for the ester interchange reaction can be employed.

If desired, a branching agent can be included in the polymerization mix, as disclosed by Hoeschele, U.S. Pat. No. 4,205,158, column 3, lines 35 through 66, which disclosure is hereby incorporated herein by reference.

Ester interchange polymerizations generally are performed in the melt without any solvent. However, inert solvents can be used to facilitate removal of volatile components from the polymerization mix. This technique is especially useful in making prepolymer by direct esterification. Polycondensation of prepolymer can also be accomplished in the solid phase by heating particles of solid prepolymer in a vacuum or in a stream of inert gas to liberate and remove low molecular weight diol.

The processes described above can be performed as batch or continuous processes. The preferred method for continuous polymerization, i.e., by ester interchange with a prepolymer, is an established commercial process.

Conventional additives can be incorporated into the elastomers of this invention by known techniques. Such additives include antioxidants, ultraviolet light stabilizers, inorganic fillers, pigments, and the like.

Melt-spun fibers of the invention can be processed in conventional elastic fiber operations, such as heat treatment (relaxed or under tension), hot drawing, weaving, knitting, dyeing and the like.

In accordance with the present invention, the weight percent of hard segment in the elastomer is in the range of 10 to 30%, preferably 15 to 27%. The mole ratio of hard segment to soft segment generally is in the range of 2.5 to 4.5. When the ratio is below the minimum value of the range, the elastomer usually possesses an undesirably low tenacity and low melting temperature. As the ratio is increased within the range, set generally increases, though this can be somewhat compensated for by increasing soft segment molecular weight. At ratios higher than 5, difficulties often are encountered in melt processing the elastomer. The best balance of processability and properties are obtained with elastomers of the invention having the preferred ratio of 2.7 to 3.5. The beneficial effects of the preferred ranges are clearly demonstrated hereinafter by the data of Examples I and II.

TEST PROCEDURES

The various characteristics and properties mentioned in the preceding discussion and in the Examples below were determined by the following test procedures.

Inherent viscosity, $\eta_{inh}$, is determined in deciliters per gram (dL/g), in accordance with W. R. Sorenson and T. W. Campbell, "Preparative Methods of Polymer Chemistry", Interscience Publishers, 2nd Ed. (1968) p. 44. A solution of 0.5 gram of polymer in 100 ml of m-cresol at 30° C. is used. In the Examples, unless indicated otherwise, samples for inherent viscosity determinations were taken from the threadline initially emerging from the spinneret.

The concentration of the hard segment in the polymer is calculated by the following formula, %HS = weight percent hard segment =

$$\frac{100(M_{hs})[(w_1/M_1) - (w_2/M_2)]}{(M_{hs})[(w_1/M_1) - (w_2/M_2)] + (M_{ss})(w_2/M_2)}$$

wherein
  w is weight
  M is molecular weight
and subscript
  hs refers to the repeat unit of the hard segment (short chain ester of formula I above)
  ss refers to the repeat unit of the soft segment (long chain ester of Formula II above)
  1 refers to the dimethyl ester of the starting diacid and
  2 refers to the long chain glycol.

Note that the weight of the long chain glycol, as used in formula, must have the weight of inert oligomeric cyclic ethers subtracted from the total weight of the glycol. The oligomeric ethers usually amount to about two weight percent.

Number average molecular weight of the glycol is determined by reacting the glycol with an excess of acetic anhydride in pyridine and then back-titrating with sodium hydroxide to measure the amount of acetic acid produced and calculating the molecular weight therefrom.

Tenacity at break, T, in deciNewtons per tex and percent elongation at break, E, are measured on an Instron Tester equipped with Series 2712 (002) Pneumatic Action Grips in accordance with ASTM Method D 2653-72, "Standard Test Method for Breaking Load and Elongation of Elastomeric Yarns".

"Unload power", in, centiNewtons per effective tex (i.e., $cN/tex_{eff}$) is measured in accordance with the general method of ASTM D 2731-72, "Standard Test Method for Elastic Properties of Elastomeric Yarns". Three filaments, a 2-inch (2.5-cm) gauge length and a zero-to-300% elongation cycle are used for each determination. Unload power (i.e., the stress at a particular elongation) is measured after the samples have been cycled five times at a constant elongation rate of 800% per minute and then held at the 300% extension for half a minute after the fifth extension. While unloading from this last extension, the stress, or unload power, is measured at elongations of 33, 60 and 100%, and are respectively designated $UP_{33}$, $UP_{60}$ and $UP_{100}$.

The % set also was measured in accordance the method of ASTM Method D 2731-72.

As reported herein, T, E and UP represent the data for best individual filaments and % Set is the average of three determinations.

EXAMPLES

The examples which follow are illustrative of the present invention and are not intended to limit the scope, which is defined by the claims. The results reported herein are believed to be representative, but do not constitute all the runs involving the indicated ingredients. In the Examples, Tables and Figures, samples identified with arabic numerals are of the invention and those identified with upper-case letters are comparison samples which are outside the invention.

For convenience, several abbreviations are employed in the examples, as follows:
  2GT—hard segment formed from ethylene glycol (2G) and terephthalic acid (T)
  3GT—hard segment formed from 1,3-propylene glycol (3G) and terephthalic acid (T)
  4GT—hard segment formed from 1,4-butane diol (4G) and terephthalic acid
  PO4G—poly(tetramethylene oxide)glycol
  THF—tetrahydrofuran
  MeTHF—3-methyltetrahydrofuran
  EO—ethylene oxide
  DMT—dimethyl terephthalate
  TBT—tetrabutyl titanate esterification catalyst
  AO-330—1,3,5-trimethyl-2,4,6-tris[3,5-di-t-butyl-4-hydroxy-benzyl]benzene antioxidant sold by Ethyl Corp.
  SS—soft segment of elastomer
  HS—hard segment of elastomer
  HS/SS—mole ratio of hard to soft segment
  %HS—percent hard segment (based on total weight of elastomer)
  $MW_{ss}$—molecular weight of long chain glycol.

The Examples describe the production and physical properties of filaments made from a variety of elastomers of the invention having 3GT hard segments and compare them to similar, closely related elastomers outside the invention having 4GT hard segments. The elastomers include soft segments having molecular weights between about 1,950 and 3,800, hard segment contents between about 15 to 28 weight percent and ratios of soft-segment to hard-segment between about 2.4 and 4.0. In producing the sample filaments of the invention and the comparison filaments, drawing conditions were selected to provide filaments having the best (i.e., lowest) percent set. The filaments usually were drawn to twice or three times their original length (i.e., 2× or 3×). Note that drawing beyond the selected draw ratio for a given sample was found to provide no significant improvement in % set. Because increase in molecular weight of the elastomer soft segment usually is accompanied by improvements in set, samples (within and outside the invention) which have the same soft segments of about the same molecular are compared.

EXAMPLE I

Figure 2:
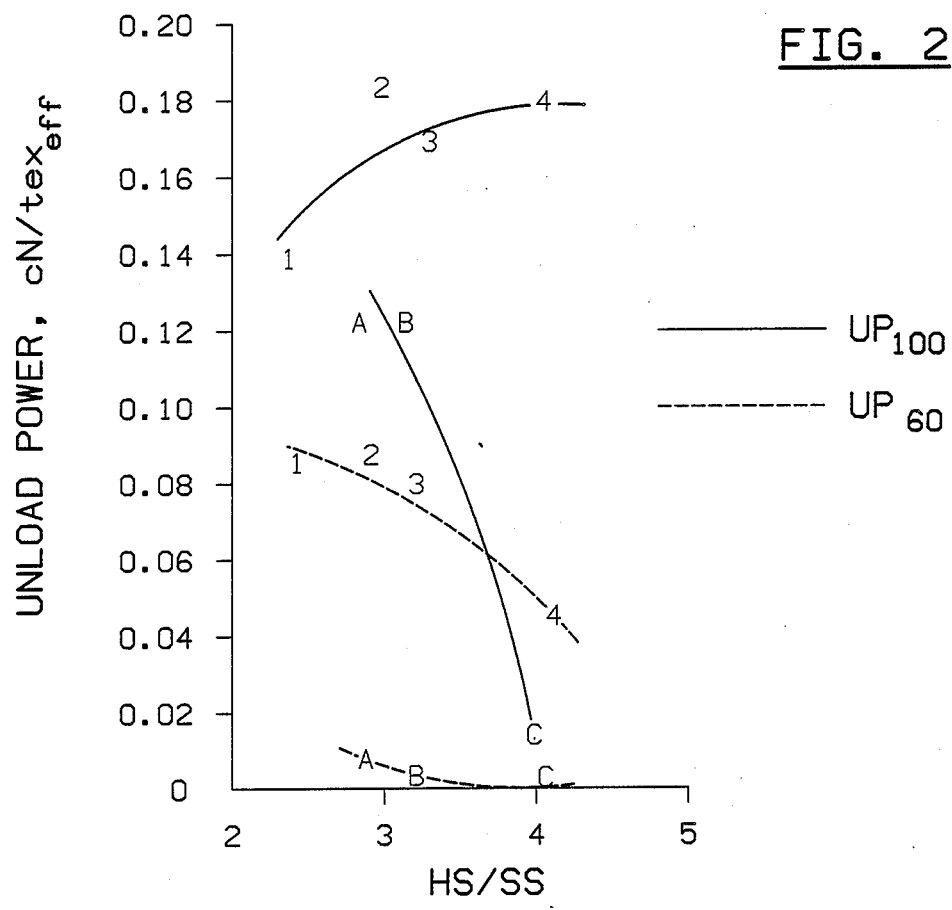

This example compares six elastomers of the invention (i.e., Samples 1–6) made with PO4G soft segments and 3GT hard segments with five similar elastomers (i.e., Samples A–E) having 4GT hard segments. The molecular weights of the soft segments of Samples 1–4 and Comparisons A–C were about 2,000; of Sample 5, about 2,900; and of Sample 6 and Comparisons D and E, about 3,400. Example I clearly demonstrates the advantages of the filaments of the invention over the comparison samples. The filaments of the invention are superior in tenacity, set and unload power. The advantageous effects of the 3GT hard segments (rather than 4GT hard segments) on unload power and set are particularly evident when the molecular weight of the PO4G soft segment is about 2,000. These effects are shown graphically in the attached FIG. 1 for filaments made of elastomers having soft-segment molecular weights of about 2,000 and in FIG. 2 for samples wherein the molecular weight is in the range of about 2,900 to 3,400. Other details of the elastomer characteristics and of the mechanical properties of the fibers that were melt-spun from the elastomers are summarized in Table 1.

The elastomer of Sample 1 was prepared by placing the following weights of ingredients in a 300-cm³ kettle, equipped for distillation:

30.0 grams of PO4G having a number average molecular weight of about 2000
10.0 grams of 1,3-propylene glycol (3G)
9.6 grams of dimethyl terephthtalate (DMT)
0.15 gram of Antioxidant 330 (manufactured by Ethyl Corporation).
1.5 cm$^3$ of a 5 weight percent solution of trabutyl titanate (TBT) catalyst in 1,3-propanediol.

A stainless steel stirrer, fitted with a paddle shaped to conform with the internal dimensions of the kettle, was positioned about 0.3 cm (⅛ inch) from the bottom of the kettle. Stirring was started. Then, the kettle was placed in a Woods metal bath heated to a temperature in the range of 237° to 241° C. for about 45 minutes, during which time stirring was continued and methanol distilled from the mix. The pressure on the system was then reduced to 0.1 mm of mercury over the course of about one hour. Distillation was continued at the reduced pressure for about two and a half hours. The resulting viscous molten product was removed from the kettle and allowed to cool. The inherent viscosity of the product was 1.64.

General procedures of the preceding paragraph were used to prepare Samples 2–6 and Comparison Samples A–E, except for small changes in reaction temperatures and/or ester interchange catalyst. Usually, temperatures higher than 260° C. were avoided. At such high temperatures, the rate of polymer degradation begins to compete with the rate of polymerization. Sometimes, when the molecular weight of the elastomer was not high enough for good filament properties (i.e., when the inherent viscosity was less than 1.6), the molecular weight was increased by solid phase polymerization (referred to as "SPP") by heating the elastomer at 160° C. under nitrogen for 12 to 72 hours in a vacuum oven. Elastomer samples that were subjected to SPP are designated in the tables with a superscript "s".

To perform the melt spinning, a cylindrical cell of 2.2-cm (7/8-inch) inside diameter and 12.7-cm (5-inch) length was employed. The cell was equipped with a hydraulically driven ram that was inserted on top of the sample. The ram had a replacable "Teflon" tip designed to fit snugly inside the cell. An annular electric heater which surrounded the lower quarter of the cell was used for controlling cell temperature. A thermocouple inside the cell heater recorded the "cell temperature". Attached to the bottom of the cell was a spinneret, the interior of which included a cylindrical passage, measuring 1.27 cm (0.5 inch) in diameter and 0.64 cm (0.25 inch) in length, which was connected to the bottom of the cell cavity. The spinneret cavity contained stainless steel filters of the following mesh, inserted in the following order, starting from the bottom (i.e., closest to the exit): 50, 50, 325, 50, 200, 50, 100, and 50. A compressible annular aluminum seal was fitted to the top of the "stack" of filters. Below the filters was a cylindrical passage of about 2.5-cm (1-inch) length and 0.16-cm (1/16 inch) interior diameter, the lower end of which was tapered (at an angle of 60 degrees from the vertical) to meet with an outlet final orifice measuring 0.069 cm (0.027 inch) in length and 0.023 cm (0.009 inch) in inside diameter. The spinneret temperature was controlled by a separate annular heater. Cell temperature usually was no more than about 20° C. higher than the spinneret temperature.

Elastomer samples were cut into small pieces, lightly dusted with antioxidant AO-330 and dried for 1 to 2 days at 110° C. under nitrogen in a vacuum oven. Dry pieces, weighing about 20 grams, were placed in the above-described cell, which had been preheated to a temperature of about 100° C. under a stream of dry nitrogen. A pressure of about 34,500 kPa (5,000 psig) was applied to the sample and cell and spinneret temperatures were raised until a filament began to extrude. Then, temperatures were raised further until the molten filament no longer exhibited melt fracture (as indicated by its ability to be drawn 4× at a throughput of about 0.5 gram per minute). At that throughput, the filament sample was forwarded in succession to (a) a take-up roll rotating at 40 meters/min, on which four wraps were made, (b) a draw roll, the speed of which was increased in proportion to the desired draw ratio (usually 2 or 3×), and around which four wraps of filament were made, and (c) a bobbin, which revolved at a rate that was slightly lower than that of the draw roll, and upon which the filament was wound. Although a finish could be applied to the filament before or as it arrived at the take-up roll to prevent interfilament adhesion, none of the filaments of Examples I–III required a finish when melt-spun at the 0.5-g/hr throughput.

Properties of the samples were then measured. The results are recorded below in Table I, along with various elastomer characteristics and conditions of production. The table clearly demonstrates, by comparison of Samples 2–4 with A–C (i.e., elastomers with $MW_{SS}=2,000$ and about the same ratios of hard-to-soft segment) that elastomeric fibers of the invention with their 3GT hard segments possess large advantages over such elastomeric fibers having 4GT hard segments. Note the generally higher tenacity, the much higher unload powers, and the much lower percent sets exhibited by the filaments of the invention. These data are plotted in FIGS. 1 and 2. Although the advantages in tenacity are not as large when the molecular weight of the soft segment is 3,000 and higher, the advantages in unload power and percent set are clearly evident.

TABLE I

Effect of Hard Segment on Fiber Properties
(Soft segments of PO4G)

| | Samples of Invention (3GT hard segments) | | | | | |
|---|---|---|---|---|---|---|
| | 1 | 2 | 3$^s$ | 4$^s$ | 5 | 6 |
| $MW_{ss}$ | 2,000 | 2,000 | 2,000 | 2,000 | 2,900 | 3,394 |
| % 3GT HS | 18.6 | 21.8 | 25.0 | 27.9 | 16.9 | 17.0 |
| HS/SS | 2.36 | 2.89 | 3.24 | 4.00 | 3.00 | 3.50 |
| $\eta_{inh}$ | 1.82 | 1.80 | 1.84 | 1.50 | 1.92 | 2.22 |
| Spin temp., °C. | 191 | 265 | 268 | 218 | 210 | 210 |
| T, dN/tex | 0.71 | 0.59 | 0.81 | 0.47 | 0.72 | 0.53 |
| E, % | 377 | 375 | 325 | 383 | 405 | 485 |
| $UP_{100}$ | 0.134 | 0.189 | 0.171 | 0.177 | 0.094 | 0.126 |
| $UP_{60}$ | 0.079 | 0.092 | 0.080 | 0.047 | 0.044 | 0.077 |
| % Set | 26.8 | 34.3 | 39.7 | 46.2 | 25.0 | 30.7 |

| | Comparison Samples (4GT hard segments) | | | | |
|---|---|---|---|---|---|
| | A | B | C$^s$ | D | E |
| $MW_{ss}$ | 2,000 | 2,000 | 2,000 | 3,394 | 3,394 |
| % 4GT HS | 23.0 | 25.1 | 29.2 | 15.8 | 17.9 |
| HS/SS | 2.89 | 3.25 | 4.00 | 3.00 | 3.50 |
| $\eta_{inh}$ | 1.81 | 1.98 | 1.67 | 1.88 | 1.71 |
| Spin temp., °C. | 190 | 200 | 302 | 182 | 202 |
| T, dN/tex | 0.50 | 0.74 | 0.56 | 0.52 | 0.52 |
| E, % | 339 | 459 | 556 | 545 | 530 |
| $UP_{100}$ | 0.121 | 0.119 | 0.007 | 0.079 | 0.029 |
| $UP_{60}$ | 0.007 | 0 | 0 | 0 | 0 |
| % Set | 54.5 | 61.1 | 84.7 | 60.7 | 86.8 |

Notes:
Superscript "s"; solid phase polymerization was used.
All samples were drawn 3×, except Samples 6, B, D and E which were drawn 2×.

EXAMPLE II

Example II demonstrates the advantage of the invention with elastomers made with soft segments of tetrahydrofuran/3-methyltetrahydrofuran copolyethers. The general methods of elastomer and filament preparation of Example I were repeated, except for the particular soft segment employed. Samples 7, 8, 9, 12 and K were each solid phase polymerized (as indicated by a superscript "s" in the tables). Except for Comparison Sample 12, which was drawn 2×, all filament samples were drawn 3×. Results, summarized in Table II below, show the great advantages of employing 3GT hard segments in accordance with the invention rather than 4GT hard segments. The advantages are particularly evident in unload power and percent set (especially when $MW_{SS}$ is less than about 3,000) of the filaments.

TABLE II

Effect of Hard Segment on Fiber Properties
(Soft segments of THF/MeTHF copolyether)

| | Samples of Invention (3GT hard segments) | | | | | |
|---|---|---|---|---|---|---|
| | $7^s$ | $8^s$ | $9^s$ | 10 | 11 | $12^s$ |
| $MW_{ss}$ | 2,081 | 2,081 | 2,607 | 2,975 | 3,685 | 3,246 |
| % MeTHF* | 7 | 7 | 12 | 12 | 15 | 7.5+ |
| % 3GT HS | 21.2 | 23.2 | 18.4 | 16.6 | 15.9 | 15.0 |
| HS/SS | 2.89 | 3.24 | 3.00 | 3.00 | 3.50 | 2.89 |
| $\eta_{inh}$ | 2.11 | 2.34 | 1.84 | 1.88 | 1.70 | 1.82 |
| Spin temp., °C. | 265 | 261 | 265 | 215 | 200 | 248 |
| T, dN/tex | 0.73 | 0.75 | 0.53 | 0.48 | 0.25 | 0.44 |
| E, % | 370 | 306 | 449 | 527 | 436 | 517 |
| $UP_{100}$ | 0.241 | 0.230 | 0.251 | 0.346 | 0.211 | 0.213 |
| $UP_{60}$ | 0.111 | 0.100 | 0.121 | 0.185 | 0.088 | 0.114 |
| $UP_{33}$ | 0 | 0 | 0.020 | 0.064 | 0.035 | 0.029 |
| % Set | 23.7 | 29.3 | 27.0 | 20.8 | 29.8 | 23.3 |
| | Comparison Samples (4GT hard segments) | | | | | |
| | F | G | H | I | J | $K^s$ |
| $MW_{ss}$ | 2,127 | 2,127 | 2,673 | 2,975 | 3,685 | 3,785 |
| % MeTHF* | 8 | 8 | 7 | 12 | 15 | 15 |
| % 4GT HS | 21.0 | 25.4 | 20.0 | 18.0 | 18.0 | 15.0 |
| HS/SS | 2.73 | 3.50 | 3.19 | 3.10 | 3.81 | 3.14 |
| $\eta_{inh}$ | 1.52 | 1.78 | 1.96 | 1.87 | 1.74 | 1.77 |
| Spin temp., °C. | 185 | 182 | 213 | 220 | nr | 236 |
| T, dN/tex | 0.47 | 0.69 | 0.57 | 0.45 | 0.38 | 0.35 |
| E, % | 470 | 347 | 420 | 495 | 430 | 488 |
| $UP_{100}$ | 0.220 | 0.130 | 0.181 | 0.259 | 0.222 | 0.196 |
| $UP_{60}$ | 0.078 | 0 | 0.065 | 0.098 | 0.077 | 0.081 |
| $UP_{33}$ | 0 | 0 | 0 | 0 | 0 | 0.002 |
| % Set | 35.0 | 50.8 | 34.2 | 31.3 | 31.7 | 25.3 |

Notes:
*Mole % of MeTHF in THF/MeTHF copolymer
+50/50 weight blend of PO4G of 2900 $MW_{ss}$ and THF/MeTHF of 3,685 $MW_{ss}$ and 15 mole percent MeTHF.
"nr" means a measurement was not recorded.

EXAMPLE III

Example III demonstrates the advantage of the invention with elastomers made with soft segments of tetrahydrofuran/ethylene oxide copolyethers (50/50 by weight). The general methods of elastomer and filament preparation of Example I were repeated, except for the particular soft segment employed. Both examples were solid phase polymerized and both sets of filaments were drawn 3×. The results are summarized in Table III below. Again the advantages of including 3GT hard segments (rather than 4GT) hard segments in the elastomeric fibers of the invention are clearly demonstrated, particularly with regard to the unload power and percent set of the fibers.

TABLE III

Effects of Hard Segment on Fiber Properties
(Soft segments of 50/50 THF/EO copolyether)

| | Sample of Invention (3GT hard segments) $13^s$ | Comparison Sample (4GT hard segments) $L^s$ |
|---|---|---|
| $MW_{ss}$ | 1,950 | 1,950 |
| % HS | 24.1 | 25.3 |
| HS/SS | 3.20 | 3.20 |
| $\eta_{inh}$ | 2.09 | 1.85 |
| Spin temp., °C. | 240 | 219 |
| T, dN/tex | 0.17 | 0.27 |
| E, % | 364 | 405 |
| $UP_{100}$ | 0.232 | 0.197 |
| $UP_{60}$ | 0.081 | 0.033 |
| % Set | 28.5 | 45.3 |

I claim:

1. A thermoplastic, segmented, linear copolyether-ester elastomer which consists essentially of a multiplicity of recurring intralinear long-chain and short-chain ester units connected head-to-tail through ester linkages, the long-chain ester units amounting to at least 70 percent by weight of the elastomer and being represented by the structure

(I)

and the short-chain ester units amounting to 10 to 30 percent by weight of the elastomer and being represented by the structure

(II)

wherein
R is a divalent radical remaining after removal of carboxyl groups from a dicarboxylic acid which consists essentially of terephthalic acid,
G is a divalent radical remaining after removal of hydroxyl groups from a poly(alkylene oxide) glycol having a carbon-to-oxygen ratio in the range of 2.0 to 4.3 and a molecular weight in the range of 1,500 to 5,000, and
D is a divalent radical remaining after removal of terminal hydroxyl groups from a diol which consists essentially of 1,3-propanediol.

2. An elastomer in accordance with claim 1, wherein the short chain ester units are substantially all poly(1,3-propylene terephthalate) units.

3. An elastomer in accordance with claim 1, wherein the poly-alkylene oxide) of the glycol is selected from the group consisting of poly(tetramethylene oxide), copolymers of tetrahydrofuran and ethylene oxide and copolymers of tetrahydrofuran and 3-methyltetrahydrofuran.

4. An elastomer in accordance with claim 3 wherein the long chain ester units have a molecular weight in the range of 1,500 to 5,000.

5. An elastomer in accordance with claim 4, wherein the molecular weight is in the range of 2,000 to 4,000.

6. An elastomer in accordance with claim 3, wherein the short chain ester units are in the range of 15 percent to 27 by weight of the elastomer.

7. An elastomer in accordance with claim 3, wherein the mole ratio of short chain ester units to long chain ester units is in the range of 2.5 to 4.5.

8. An elastomer in accordance with claim 7, wherein the wherein the mole ratio is in the range of 2.7 to 3.5.

9. An elastomer in accordance with claim 3, 5, 7 or 8, wherein the short chain ester units are derived from a copolymer of tetrahydrofuran and 3-methyltetrahydrofuran, with the mole percent of 3-methyltetrahydrofuran in the copolymer being in the range of 7 to 15.

10. An elastomer in accordance with claim 3, 5, 7 or 8, wherein the short chain ester units are derived from a copolymer of tetrahydrofuran and ethylene oxide, with the mole percent of ethylene oxide being about 50.

11. An elastomer of any of claim 1 in the form of a melt-spun fiber.

12. A drawn fiber of claim 11.

* * * * *